US008458277B2

(12) United States Patent
Moore et al.

(10) Patent No.: US 8,458,277 B2
(45) Date of Patent: Jun. 4, 2013

(54) METHOD AND SYSTEM FOR PROVIDING UNIVERSAL RELAY SERVICES

(75) Inventors: Richard G. Moore, Cedar Rapids, IA (US); Guna D. Gunasekar, Cedar Rapids, IA (US); Phillip E. Lawson-Shanks, Aldie, VA (US); Darryl W. Shaw, Lansdowne, VA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 2230 days.

(21) Appl. No.: 10/975,971

(22) Filed: Oct. 28, 2004

(65) Prior Publication Data

US 2005/0198164 A1    Sep. 8, 2005

Related U.S. Application Data

(60) Provisional application No. 60/537,896, filed on Jan. 22, 2004.

(51) Int. Cl.
*G06F 15/16* (2006.01)

(52) U.S. Cl.
USPC ........................... 709/207; 709/227; 709/228

(58) Field of Classification Search
USPC .......................... 709/206, 207, 203, 204, 205
See application file for complete search history.

(56) References Cited

U.S. PATENT DOCUMENTS

| | | | | |
|---|---|---|---|---|
| 6,591,291 B1 * | 7/2003 | Gabber et al. | | 709/206 |
| 6,976,092 B1 * | 12/2005 | Daniell et al. | | 709/246 |
| 6,993,564 B2 * | 1/2006 | Whitten, II | | 709/207 |
| 7,275,215 B2 * | 9/2007 | Werndorfer et al. | | 715/752 |
| 7,328,247 B2 * | 2/2008 | Penner et al. | | 709/206 |
| 2001/0003202 A1 * | 6/2001 | Mache et al. | | 713/153 |
| 2001/0029455 A1 | 10/2001 | Chin et al. | | |
| 2002/0065894 A1 | 5/2002 | Dalal et al. | | |
| 2003/0018726 A1 * | 1/2003 | Low et al. | | 709/206 |
| 2003/0065788 A1 * | 4/2003 | Salomaki | | 709/227 |
| 2003/0104827 A1 | 6/2003 | Moran et al. | | |
| 2003/0125927 A1 * | 7/2003 | Seme | | 704/3 |
| 2003/0217108 A1 | 11/2003 | Karim | | |
| 2004/0205243 A1 * | 10/2004 | Hurvig et al. | | 709/245 |
| 2004/0267942 A1 * | 12/2004 | Maes | | 709/228 |
| 2007/0255794 A1 * | 11/2007 | Coutts | | 709/206 |

FOREIGN PATENT DOCUMENTS

| | | | |
|---|---|---|---|
| GB | 2 365 674 B | | 3/2004 |
| WO | WO0161920 | * | 2/2001 |
| WO | 03/021900 | | 3/2003 |

* cited by examiner

*Primary Examiner* — Aaron Strange

(57) ABSTRACT

An approach for providing instant messaging (IM) services is disclosed. A request is received from a source client to establish communication with a destination client associated with a subscriber over a first IM environment, wherein the request specifies a first user name derived from a unique identifier of the subscriber. A unique identifier is determined from the first user name. Further, a profile of the subscriber is accessed based on the unique identifier to determine a second user name corresponding to a second IM environment. An IM session is established between the source client and the destination client over the first and second IM environments using the respective first user name and second user name.

28 Claims, 9 Drawing Sheets

METHOD AND SYSTEM FOR PROVIDING UNIVERSAL RELAY SERVICES

RELATED APPLICATIONS

This application is related to, and claims the benefit of the earlier filing date under 35 U.S.C. §119(e) of, U.S. Provisional Patent Application filed Jan. 22, 2004 (Ser. No. 60/537, 896), entitled "Comprehensive Communication Service System"; the entirety of which is incorporated herein by reference.

FIELD OF THE INVENTION

The present invention relates to communications, and more particularly, to providing integrated communication services.

BACKGROUND OF THE INVENTION

Given the competitive landscape of communication services, service providers need to be more innovative in seeking new sources of revenue. When developing new services, service providers are ever mindful of cost. In general, the introduction of new communication services requires a large investment in new infrastructure, not to mention development costs. It is observed that despite the popularity of the Internet and its many applications, the development of data communications are not well integrated. For example, certain data communication services, such as instant messaging (IM), are not well integrated. Traditionally, providers of these services operate autonomously, utilizing proprietary software and communication protocols to establish IM sessions.

The lack of integration of communication services is made more evident when examining the largely independent existence of telephony and data systems. That is, the advancement in services on the telephony side has not been well integrated on the data network side. Conventionally, a user is required to employ several disparate systems and service providers to engage in various modes of communication, ranging from telephony to instant messaging services.

Generally, each communication system may employ a different addressing scheme by which parties or devices are specified. For example, a user may have one or more telephones numbers; e.g., home number, work number, and cellular number. Additionally, the user may also have pager or facsimile devices, each with their own telephone numbers. Beyond these telephony-based services, other staple communication services are executed over data communication networks, such as electronic mail and information/entertainment delivery. The popularity of instant messaging has also afforded the user with yet another avenue to communicate. Yet another way that the user may engage in communication is through use of a web site. For each of these modes of communication, the user is forced to use different separate accounts with different telephone numbers and/or addresses.

Therefore, there is a need for an integrated approach to providing comprehensive communication services. There is also a need to deploy a communications service that utilizes existing infrastructure. There is a further need to support a new source of revenue for communication services.

SUMMARY OF THE INVENTION

These and other needs are addressed by the present invention, in which an approach is presented for providing a universal relay service over multiple instant messaging (or communication) environments using an overlay network encompassing a data communication services and telephony services. The overlay network includes a service provider system that supports an instant messaging (IM) environment and one or more connectors (or gateways) for linking IM sessions across the different IM environments. A request is received from a source IM client to establish communications with a subscriber associated with a destination IM client. The request specifies a screen or user name derived from a primary identifier that uniquely identifies the subscriber within the overlay network. The service provider system accesses profile information pertaining to the subscriber to retrieve another user name corresponding to a different IM environment based on the presence of the subscriber within the particular IM environment. According to one embodiment of the present invention, the many different IM environments are operated by different providers. The above arrangement advantageously provides an integrated approach to supporting instant communication services using existing communication infrastructure. This approach also provides service providers with a new, viable source of revenue. The approach, in effect, provides users of instant messaging services a type of value-added service that telephone operators provide to users of existing telephone networks. These services include assistance in identifying and locating a desired communicator and assistance in carrying out the desired communication; this can include protocol translation or actual spoken language translation services performed by either a human and/or automated systems.

According to one aspect of the present invention, a method for providing instant messaging (IM) services is disclosed. The method includes receiving a request from a source client to establish communication with a destination client associated with a subscriber over a first IM environment, wherein the request specifies a first user name derived from a unique identifier of the subscriber. The method also includes determining the unique identifier from the first user name. Further, the method includes accessing a profile of the subscriber based on the unique identifier to determine a second user name corresponding to a second IM environment. An IM session is established between the source client and the destination client over the first and second IM environments using the respective first user name and second user name.

According to another aspect of the present invention, a computer-readable medium carrying one or more sequences of one or more instructions for providing instant messaging (IM) services is disclosed. The one or more sequences of one or more instructions including instructions which, when executed by one or more processors, cause the one or more processors to perform the step of receiving a request from a source client to establish communication with a destination client associated with a subscriber over a first IM environment, wherein the request specifies a first user name derived from a unique identifier of the subscriber. Other steps include determining the unique identifier from the first user name; and accessing a profile of the subscriber based on the unique identifier to determine a second user name corresponding to a second IM environment. An IM session is established between the source client and the destination client over the first and second IM environments using the respective first user name and second user name.

According to another aspect of the present invention, a method for communicating with an instant messaging (IM) client is disclosed. The method includes generating a request for establishing communication with a destination client associated with a subscriber of an overlay communication system over a first IM environment. The method also includes sending the request to the overlay communication system, wherein the request specifies a first user name derived from an identifier uniquely identify the subscriber within the overlay communication system, the overlay communication system accessing a profile of the subscriber based on the identifier to determine a second user name corresponding to a second IM environment. An IM session is established with the destination client over the first and second IM environments using the respective first user name and second user name. Further, the method includes communicating with the destination client through the overlay communication system.

According to yet another aspect of the present invention, a system for supporting instant messaging (IM) communication is disclosed. The system includes an overlay network configured to provide a plurality of communication services including telephony and data communication services, and to receive a request from a source client to establish communication with a destination client associated with a subscriber over a first IM environment. The request specifies a first user name derived from a unique identifier of the subscriber. The overlay network is further configured to determine the unique identifier from the first user name, and to access a profile of the subscriber based on the unique identifier to determine a second user name corresponding to a second IM environment using the respective first user name and second user name. The system also includes a gateway communicating with the overlay network to establish an IM session between the source client and the destination client over the first and second IM environments.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for supporting universal relay services within disparate instant messaging (IM) environments are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
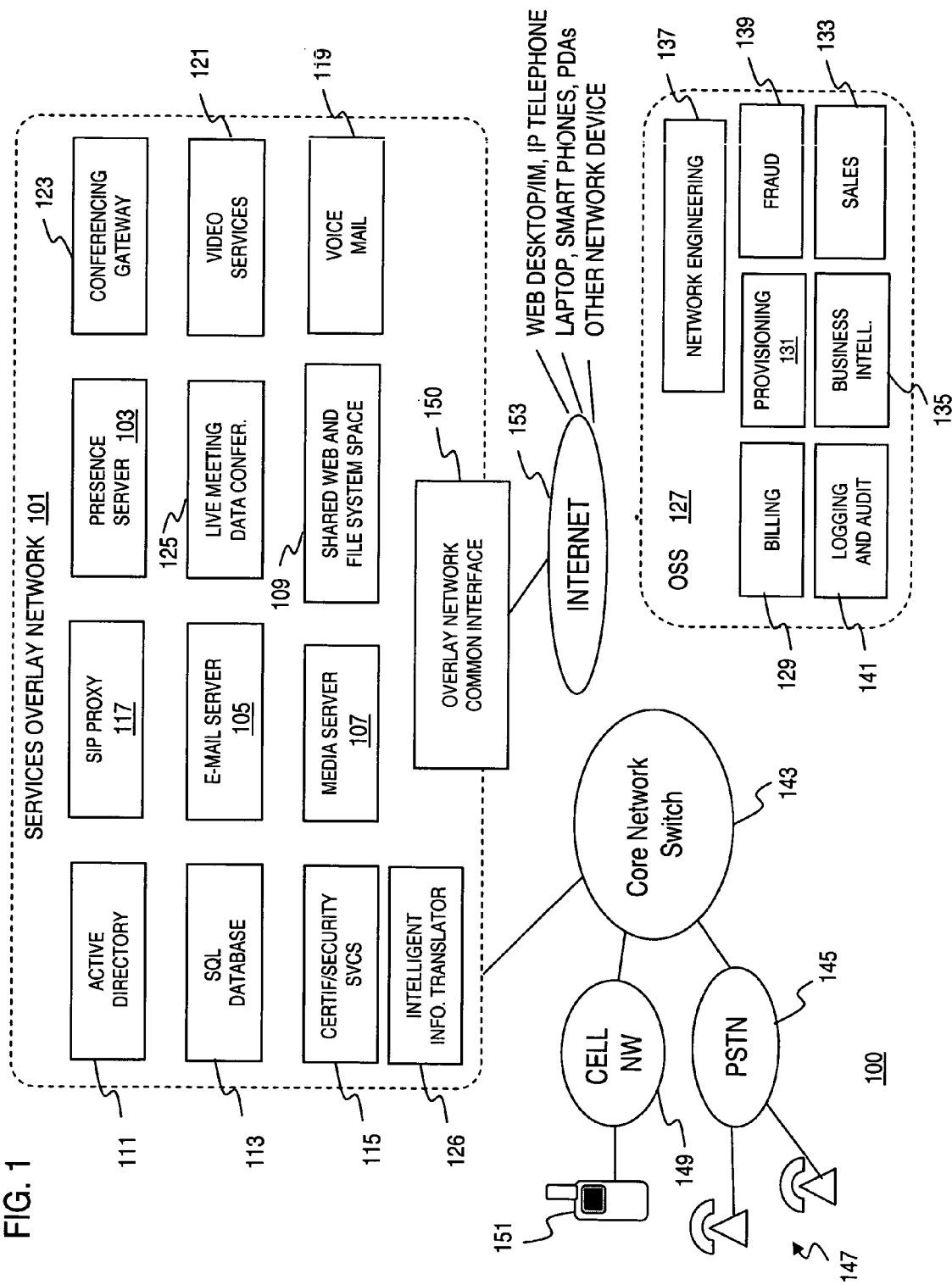
FIG. 1 is a diagram of a communication system employing a services overlay network for providing communication services, according to an embodiment of the present invention.

FIG. 1 is a diagram of a communication system employing a services overlay network for providing communication services, according to an embodiment of the present invention. A communication system 100 can be deployed to provide integrated, comprehensive communication services, ranging from traditional telephony services with enhanced calling features to instant communication (or instant messaging) services. As seen, an overlay network 101 accommodates a variety of media and modes of communication, advantageously providing flexibility and customizability in the manner such communications are conducted. The network 101 provides numerous enhanced features, e.g., as directory and conferencing services, to facilitate establishment of communication sessions among parties. The overlay network 101 is "comprehensive" in a sense that a single subscription or user account encompasses several modes of communication across different communication platforms. Also, to facilitate communication, some form of message or protocol translation and/or language translation may be conducted by the overlay network 101.

It is recognized that the efficiency and convenience of the multitude of communication modes could be improved if consistency in addressing can be ensured. Accordingly, in conjunction with the diverse and varied service offerings, the network 101 allocates to a subscriber a coordinated set of identifiers of addresses for use across the platforms corresponding to the communications modes. This greatly simplifies contacting a user through any of the available modes of communication. As used herein, the term "subscriber" pertains to a human user or organization, or can denote a system (e.g., directory system, telecommunication platform, host, etc.).

By way of example, given that the services are comprehensive and involve a multiplicity of different communication platforms, the services are supported with an overlay network 101 controlled by a service provider. The services overlay network 101 encompasses the following components and subsystems: a presence information server 103, an e-mail server 105, a media server 107, a shared web and file system space 109, an active directory 111, and a relational database 113 (e.g., Structured Query Language (SQL) based system), and a certificate and security server 115. In addition, the services overlay network 101 supports telephony services over data communication systems (e.g., Voice over Internet Protocol (VoIP)) through, for example, a Session Initiation Protocol (SIP) proxy 117. Further, a voice mail system 119 is included in the overlay network 101, as well as a video services system 121. Details of exemplary video relay services are more fully described in commonly assigned co-pending application (Ser. No. 10/699,823), entitled "Method and System for Providing Communication Services for Hearing-Impaired Parties," (filed Nov. 4, 2003); the entirety of which is incorporated herein by reference. Extensive conferencing capabilities are offered by a conferencing gateway 123 and a live meeting conferencing system 125, such as an application or screen sharing service. An intelligent information translator 126 can also be supported by the services overlay network 101. The translator 126 can provide protocol translation among disparate communication systems, and conversion among different communication modalities, as well as linguistic services (e.g., conversion from English to Chinese).

Under this exemplary scenario, the service provider also has an operation support system (OSS) 127, which supplies a variety of management and operational functions relating to the services overlay network 101. From a business perspective, the OSS 127 contains a billing module 129 for tracking usage and applying appropriate charges, a services provisioning module 131 for procuring the communication services, a sales module 133 to support sales activities, and a business intelligence module 135 for effecting business rules and policies. The OSS 127 further includes a network engineering module 137 for providing maintenance and monitoring activities to ensure proper performance of the services overlay network 101. A fraud module 139 is provided to monitor potential fraudulent activities associated with the many communication services offered by the services overlay network 101. Further, a logging and audit module 141 is included for tracking activities of the network 101.

In this example, a circuit-switched telephony system 143 operated by the service provider employs Class 3 and/or Class 5 switches to communicate with a Public Switched Telephone Network (PSTN) 145, which serves telephone stations 147. The telephony system 143 also has access to a cellular network 149 supporting cellular devices (e.g., cell phone 151).

As shown, the services overlay network 101 has connectivity via an overlay network common interface 150 to a public data network, such as the global Internet 153, which can support a multitude of devices (e.g., desktop PCs, laptops, Personal Digital Assistant (PDAs), smart phones, set top box, or other network device) and clients (e.g., browser, IM client, etc.). The overlay network common interface 150 provides a common, reusable access point to the business services within the overlay network 101 so that the functions of this network 101 can be instantiated, modified, queried, monitored, audited and used in a standardized manner (e.g., eXtensible Markup Language (XML) web service).

Because of the breadth of communication service offerings in conventional systems, a user can engage in varying modes of communication, which as noted above involves use of diverse communication platforms. For example, when a first user ("calling party") wishes to communicate with another user ("called party"), or to locate or obtain information about the called party, the calling party selects a mode of communication and then recalls or obtains an address or identifier that is compatible with the mode of communication. The identifier specifies the called party or at least a device (e.g., phone, fax machine, computer, gaming console, television, etc.) that the called party is believed to be using for the communications. The calling party may then attempt to communicate using the chosen communication mode. If this attempt is unsuccessful, the calling party may have to select a different mode, apply a different address pertaining to the alternative mode and attempt communications again.

Terms such as "calling party" and "called party" are used herein to refer to parties that are to engage in communication, not simply in the context of telephony communications. In many of the scenarios described below, the "called party" will usually be a subscriber of the service supplied by the overlay network 101. For convenience, these terms are borrowed from the familiar field of traditional telephony, but it should be understood that many forms of communication may be sought and achieved other than a telephone call. Furthermore, the resultant communications may be real-time, two-way communications, such as telephony, or may be unidirectional or "asynchronous" like the sending of voice-mail and e-mail.

Beyond telephone numbers, a user may maintain other addressing information corresponding to other communication services, such as e-mail, and instant communications. These modes of communication involve a packet-switched data network as a primary transport. For each of these modes of communication, conventionally, the user possesses many separate accounts or may have a single account associated with several aliases. Yet another way that the user may be available, in some sense, in a communications environment is through a web site, or similar shared network based space. In this instance, the user may post information for others to view and respond to.

In the case of telephone communications, the "Find-me" feature has been implemented to try to reach a called party at multiple locations, thereby alleviating the need for a calling party to remember the numerous telephone numbers and to manually dial such numbers. As a further refinement, the list of phone numbers associated with the called party and maintained by the network is frequently updated to improve the likelihood of reaching the called party as quickly and efficiently as possible.

Another approach developed in telephony systems involves providing multiple services via a single call to an interactive platform, whereby a so-called "single number platform" provides telephone, pager, facsimile and voice-mail deposit. Even under these systems, other modes of communication, such as those supported over data communications networks, are excluded from this single number platform because such services employ an entirely different infrastructure in terms of hardware and software.

While Find-me features and single number platform approaches provide some relief in telephony communications, neither approach, as traditionally deployed, addresses the problem of managing the many disparate systems, interfaces, addressing schemes and different service providers associated with the variety of communication modes. Furthermore, traditional Find-me feature seeks to locate a called party on a trial-and-error (and often sequential) basis, which can be slow, inefficient and inconvenient to the calling party.

By contrast to these telephony-based services, the overlay network 101 integrates services from both the telephony and data arenas. The overlay network 101 provides for unification of communication services as well as support presence mechanisms. For example, the overlay network 101 seamlessly support media crossover from telephony sessions to instant communication or messaging sessions and electronic mails, despite the fact that such services involve different media types (e.g., audio versus textual data) and different terminal devices or user interfaces. As a further contrast, instant messaging (IM) and e-mail communications are addressed using alphanumeric identifiers, which differ substantially from traditional telephone numbers.

It is recognized that "presence" information, which indicates a user's availability to communicate at a particular device or address, plays an important role in integrating communication services. When presence is employed to facilitate the establishment of communications, the presence information server 103 maintains timely information about where the party may be located, at least logically, within the communications system 100. Presence can be conveyed in a number of ways. For instance, a subscriber using some form of communication device, such as a SIP telephone or an instant messaging client, can explicitly indicate their availability to communicate by performing a registration or by simply logging into an interface. The centralized presence information, as provided by the overlay network 101 via the presence information server 103, provides for ubiquity of access for updating presence status.

To appreciate the architectural advantages provided by the services overlay network 101, an alternative scenario is described such that the functionalities of the network 101 (to the extent possible) are effected at the end-user equipment, as opposed to the network. The end user can conceivably achieve a limited integration or interoperation among, for example, telephony, IM and e-mail. That is, because these various modes of communication converge within the one computer, it may be possible to provide some rudimentary degree of integration. The availability of all these capabilities relies upon the user's personal computer remaining operational at all times and being able to access the various IM, telephone and e-mail services. This end-user approach also requires the user to have the requisite knowledge and ability for determining how to accomplish the desired functions and to upgrade or purchase new software or hardware implements as needed to support the functions. Furthermore, the user must interface with each of the separate providers of the various modes of communications, where applicable, to maintain an active account and technical compatibility. Consequently, this approach encumbers the user with respect to time and expenses. Therefore, it is not cost effective or convenient for most users to have to manage their communications environment in this manner. Further, it is not consistent with the concept of universal service, which is required for communication systems.

Other problems with providing services using only end-user equipment relate to challenges of remote administration and the technical constraints that attend small scale systems. For example, the number of telephone lines required to handle all possible combinations of inbound calls and outbound dial-out poses a significant technical obstacle. If a personal computer in a household or small business has two lines dedicated for enhanced features, then an inbound call involving a dial-out will occupy both of the lines for the duration of the communication. Any other inbound calls occurring during this time would be denied.

In terms of service administration, if the user needs to reconfigure the computer to alter service-affecting settings or retrieve voice mail or e-mail, the user may be gravely restricted in terms of interaction with the computer. For instance, unless the personal computer supports a web interface, an interactive voice interface and the like, the user may not be able to enjoy the same multi-modes of access and richness of functionality that could be provided via a network service provider. Also, as the user travels to other locations away from the "home" communications environment, the features may not freely extended to other locations because telephone lines or key communication interfaces or devices are not available. Additionally, depending on how remote access to the computer is accomplished, the user's interaction with the dedicated personal computer may also occupy channels of communication in such a way as to temporarily limit the computer's ability to handle inbound communications from other parties.

The services overlay network 101 supplies managed services, whereby the encumbrances to the end users are minimized. As another example of why it is advantageous for some application-level data and processing function to reside in the network, it is noted that many sophisticated features are dependent upon a combination of sets of profile or configuration information. Such features are impossible or very impractical to implement in any reliable fashion if individual computer devices must interoperate with one another to provide coherent service processing. On the other hand, a central network-resident feature processor (or alternatively, a managed network of processors, such as a grid computing system) having immediate access to both profiles may perform very fast and reliable, yet sophisticated feature processing.

Yet another advantage to having a carrier or service provider maintain responsibility for features provided to users (or subscribers) is that extensive testing may be performed to provide robust, well-behaved features. Such testing takes into account a variety of possible interactions. It would be impractical, if not impossible, for subscribers to perform the degree of testing necessary to provide such robust features. Furthermore, it is unreasonable to expect a large number of end user computers to interoperate reliably, given the countless possible hardware and software configurations that can be utilized by these computers. Thus, it is clear that certain functions are better suited as network services than deployment within separate equipment maintained by each user.

As described above, a service provider may offer high availability and reliability of service, high economies of scale and ubiquitous access. Aside from circumventing the above mentioned problems, the network-side integration of multiple modes of communication under the control of a single service provider also makes possible new levels of useful functions such as profile and presence-dependent features, which may apply across multiple modes of communication. For example, a request from a first party to communicate to a second party may be fulfilled using any available mode of communication, and even a combination of modes in accordance with a rich inter-modal feature set.

A service provider may also maintain and apply per-user profile or configuration information that spans across applications, communications modes, and physical or logical boundaries and may be readily accessed from any point where it is needed for communications processing and for review and customization by the user.

By handling a number of normally disparate communications types through a single provider that can be accessed through the well defined common interface 150, the overlay network 101 also enables improved business models. For example, the billing module 129 can adopt a metered usage or periodic subscription-based form of billing for usage. This is in contrast to the up-front purchase or per-seat licensing arrangements typical in the commercial deployment of software applications. Billing options include impromptu arrangements involving collect "calls," calling cards, credit/debit cards, pay-per-use (or view) and other alternate billing arrangements to which telephony or cable network users are accustomed.

In contrast to engaging several disparate modes of communications and associated service providers, the network 101 provides subscribers with the convenience of "one-stop shopping" and product bundling for a comprehensive set of services and advanced features. In instances where monitoring and accounting of usage activity is important to a subscriber (e.g., a business entity), complete and sophisticated accounting and audit can be enabled across all of the modes of communication.

Figure 2:
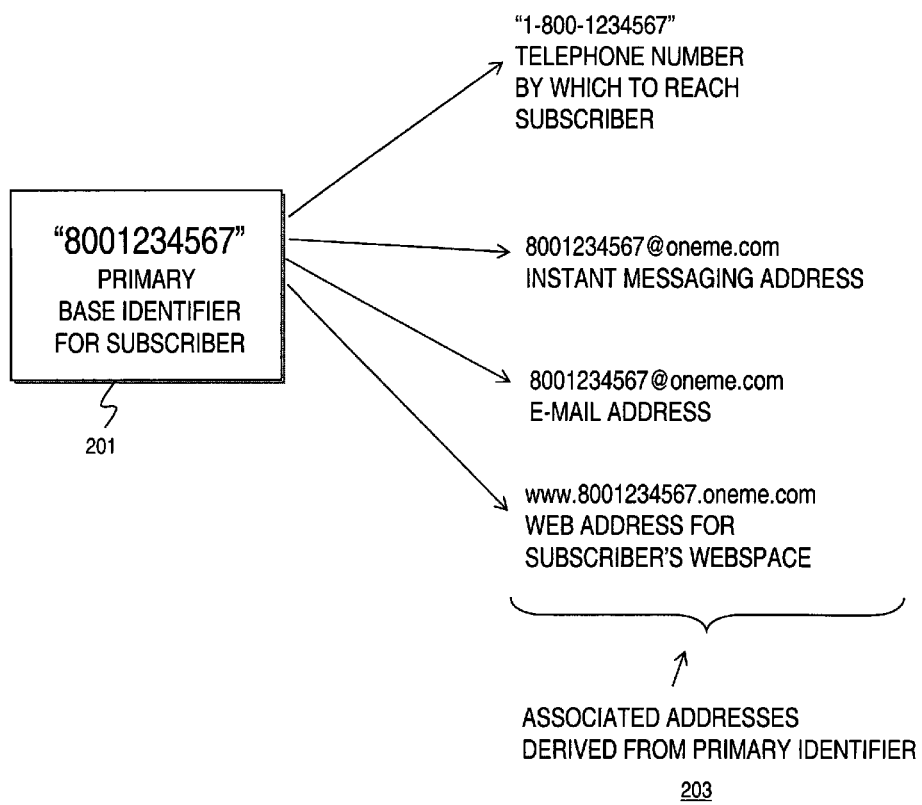
FIG. 2 is a diagram showing the correlation between primary identifiers uniquely associated with users of the communication system of FIG. 1 with one or more secondary identifiers corresponding to various modes of communication, according to an embodiment of the present invention.

FIG. 2 is a diagram showing the correlation between primary identifiers uniquely associated with users of the communication system of FIG. 1 with one or more secondary identifiers corresponding to various modes of communication, according to an embodiment of the present invention. As the service offerings of a service provider encompass multiple modes of communication and provides new value by the combination of these modes (i.e., cross-mode features and single subscription or profile for multiple services), the service provider can advantageously supply subscribers with a unified identity or suite of identities by which other parties may communicate with them.

A unique identifier (i.e., "primary" identifier) 201 is assigned to each subscriber in a communications service. This assignment can be performed in advance or on-the-fly via an automated system or by human intervention (e.g., manual operator). The unique identifier serves as the "core" for a variety of address types. Upon subscribing to the service, the unique identifier is used to reserve addresses in a variety of name spaces corresponding to different modes of communication. In a sense, the core identifier is a unique global identifier associated with each subscriber across all communication services of the overlay network 101.

The primary identifier 201, by itself, may or may not be appropriate for addressing communications in a specific mode of communication. The primary identifier 201 can be, for example, a telephone number that is used for placing telephone calls; this identifier 201 can be adapted to other forms of addresses, such as e-mail addresses, by concatenating other elements of an address, such as a domain name. That is, from this primary identifier, the network 101 maps to other secondary identifiers 203 that are suitable for specific modes of communication.

In essence, the primary identifier 201 provides convenience to parties seeking to contact a particular subscriber, wherein the parties need only know one identifier corresponding to the subscriber to communicate over a number of different communication mechanisms. With the primary identifier, if one form of address for the subscriber is known, then other forms of address may be readily ascertained. This mapping is transparent to the calling party. For convenience, the primary identifier 201 can be based upon a pre-existing identifier associated with the subscriber, such as a telephone number, that is already well known to other parties, as described in the example of FIG. 2.

As shown, a personal "800" number may be the primary identifier 201 for a given subscriber, such that the core identifier is "8001234567." The subscriber can also be allotted an instant messaging address, and an e-mail address as follows: 8001234567@oneme.com. The subscriber can further be assigned a web address of www.8001234567.oneme.com. Each of these secondary identifiers contains the core identifier of "8001234567." Any form of identifier, address or alias may be used to specify the called subscriber. By utilizing some common textual information among the identifiers, any of these addresses can be readily derived from one another. The improved degree of commonality among these addresses also facilitates operation of the directory function supported by the directory 111. As another example, the primary number can be arbitrary or assigned by the business employer. The assigned identifier can also be textual representations provided that a suitable text-to-telephone number mapping occurs within the overlay network 101 to allow for traditional telephone processing, which is number based. This mapping can occur in the directory 111 or similar such directories (not shown).

In certain conventional text paging environments, identifiers have been used such that a telephone number of a particular pager corresponds to an e-mail address by which messages may be addressed to the same pager. In other words, the telephone number and e-mail address resolve to the same address, wherein the telephone number and e-mail address are unable to reach end devices other than the pager. In contrast, the overlay network 101 provides for feature processing wherein communications directed to a common address may result in establishment of communication with different devices. The telephone number and e-mail address, which are used to reach a subscriber, may for purposes of achieving a unified suite of identifiers for the subscriber, be decoupled from an actual telephone number associated with a pager, and the pager may actually be provided by a different service provider than the one through which telephone and e-mail services are provided to the subscriber.

Also, in conventional text paging systems, the addressing is not freely extensible to, for example, an instant messaging screen name because the paging service provider does not also operate an IM service for the paging customer and does not have control of IM addresses through IM providers.

Figure 3:
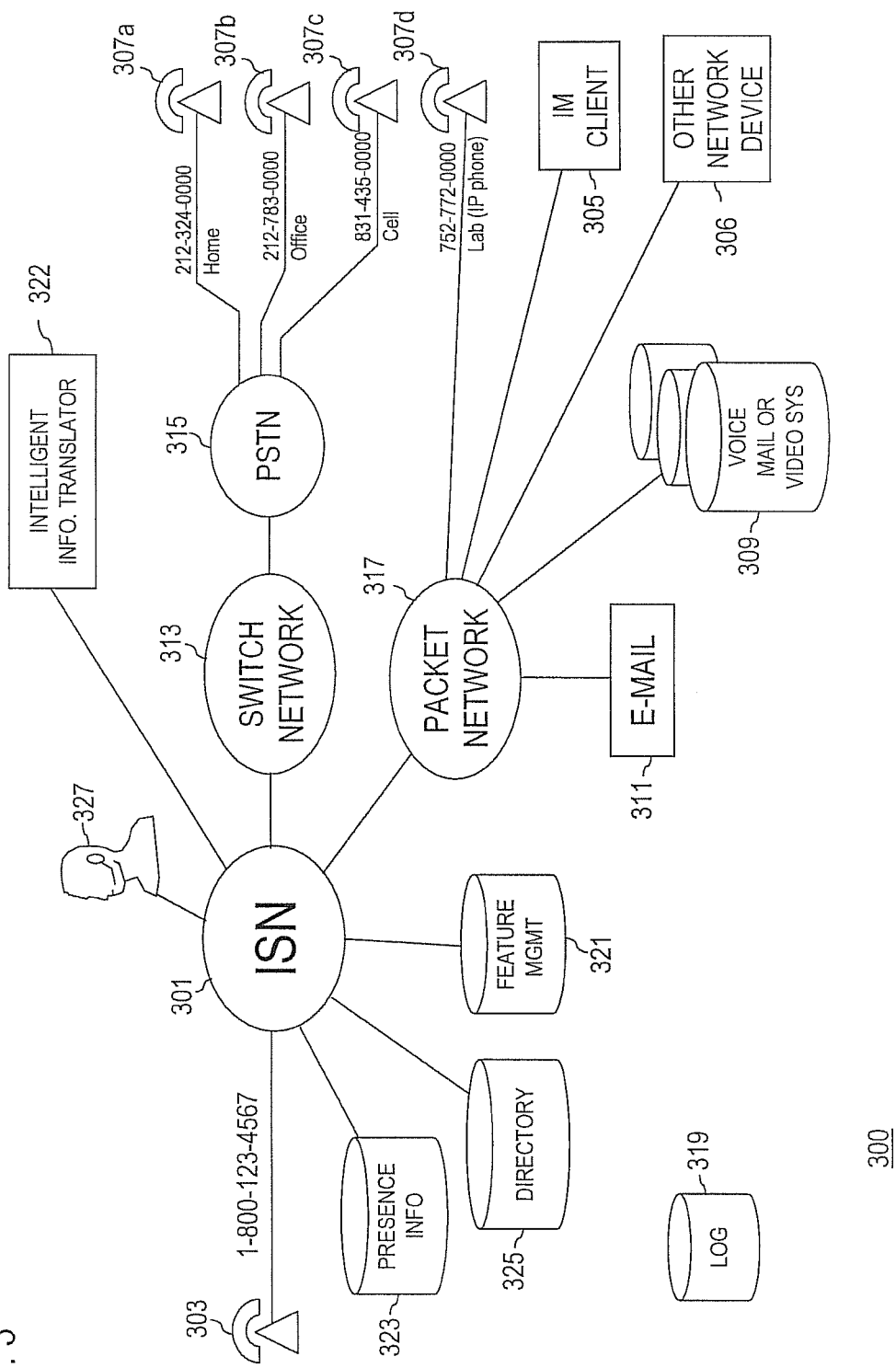
FIG. 3 is a diagram of an intelligent service node capable of implementing the services overlay network of FIG. 1.

FIG. 3 is a diagram of an intelligent service node capable of implementing the services overlay network of FIG. 1. Continuing with the example of FIG. 2, the subscriber to the services of the services overlay network 101 is associated with a unique logical address, which in this case is a unique "800" telephone number. A calling party who wishes to contact the subscriber calls the subscriber's "800" number, causing the telephone call to be switched to an intelligent services node (ISN) platform 301. The routing of the call based upon the dialing of an "800" number is well known in the field of telephony intelligent networks, whereby such routing can be performed according to Signaling System 7 (SS7) using Transaction Capabilities Application Part (TCAP) messages.

To initiate a call to a subscriber, a calling party using a telephone device 303 to contact the ISN platform 301 by dialing a specific telephone "1-800-123-4567." This telephone number corresponds to one of the suite of secondary identifiers that is derived from the subscriber's primary identifier, namely "8001234567."

It should be understood that the "call" may arrive in ways other than a telephone connection. For example, a party using an instant messaging client 305 may similarly access the ISN platform 301 and interact with the platform 301 via automated response system or manual operator in pursuit of the subscriber. A call from the IM client 305 may be handled using feature processing similar to a telephone call, but the handling of the call may be differentiated based on the nature of the IM client 305 and its capabilities, available bandwidth, etc.

Upon placing a telephone call to, or otherwise contacting the intelligent services node (ISN) platform 301, the calling party can be presented with the options of finding the subscriber, attempting to reach the subscriber by instant messaging or e-mail or being routed into voice mail, or this can occur automatically without requiring user intervention.

In FIG. 3, the subscriber is associated with several possible terminations, such as telephones 307a-d, IM client 305, other network device 306 (such as entertainment or information console (e.g., television or gaming systems)), a voice mail repository 309, and an e-mail system 311. Each termination corresponds to a logical address, location, device or modality by which the called party may be contacted or by which an inbound call may at least be terminated or handled by voice mail, for example. Conventional telephone terminations may be reached via conventional telephone networks as indicated by switch network 313 and PSTN 315. Although not shown, some telephones may be coupled to the PSTN 315 through a Private Branch Exchange (PBX).

The IP phone 307d can communicate via a data network, such as a packet network 317. The packet network 317 also provides data communications between ISN platform 301 and several network elements that accept textual data or streaming data representing audio or other media. These elements include IM client 305, voice mail repository 309 and e-mail system 311. As shown and previously mentioned, an intelligent information translator 322 is provided for translating among different communication modalities and supporting such translation services as text-to-speech, one type of speech to another type of speech, video encoding types, etc.

The communication system 300 utilizes a log database 319 that records network events occurring during the course of providing services. This log may record a variety of information and may be useful to provide billable usage information, assist in traffic engineering and fraud detection, and to provide the subscriber with useful data and statistics.

An inbound call may be routed and processed in a variety of ways as the communications system acts upon a calling party's request. The manner in which inbound calls are handled may be controlled by a profile associated with the subscriber and maintained in a feature management database 321. The subscriber may exercise control over the profile to affect how calls are handled and to where calls are directed. A portion of the profile may relate to a set of contact locations, such as telephone numbers, which should be tried when the subscriber is to be contacted. In an exemplary embodiment, these contacts include an office telephone, a mobile phone, a home telephone or addresses corresponding to other locations or devices to be contacted. The profile can also indicate such user preferences as time of day, and whether parallel, sequential, or overlapping logic is to be used for handling answering scenarios.

To improve the efficiency of handling an inbound call, presence information of the subscriber can be used to determine the best communication mode for contacting the subscriber. If it can be determined that, at the time of an inbound call, the subscriber is located with certainty at a specific one of the listed contacts and is receptive to communications, then that contact may be tried preferentially (or designated with higher priority). Likewise, if it can be determined that the subscriber is probably unavailable via a given contact, then attempts to reach the party via that contact may be avoided or at least used as a last resort.

Current or updated presence information for the subscriber is maintained in a presence information server 323, which may also be referred to as a presence database or location server. In the course of handling the inbound call from calling station 303, the ISN platform 301 may consult the presence information server 323 to determine what communication mechanisms are available for reaching the subscriber, along with the contact addresses or locations that should be tried. The presence information, in an exemplary embodiment, is determined from the subscriber being logged onto an IM client 305. Also, the subscriber can explicitly indicate at one of the telephone devices 307, such as user registration at an EP phone 307d, that they are receptive to communications at a particular location or telephone number.

Figure 4:
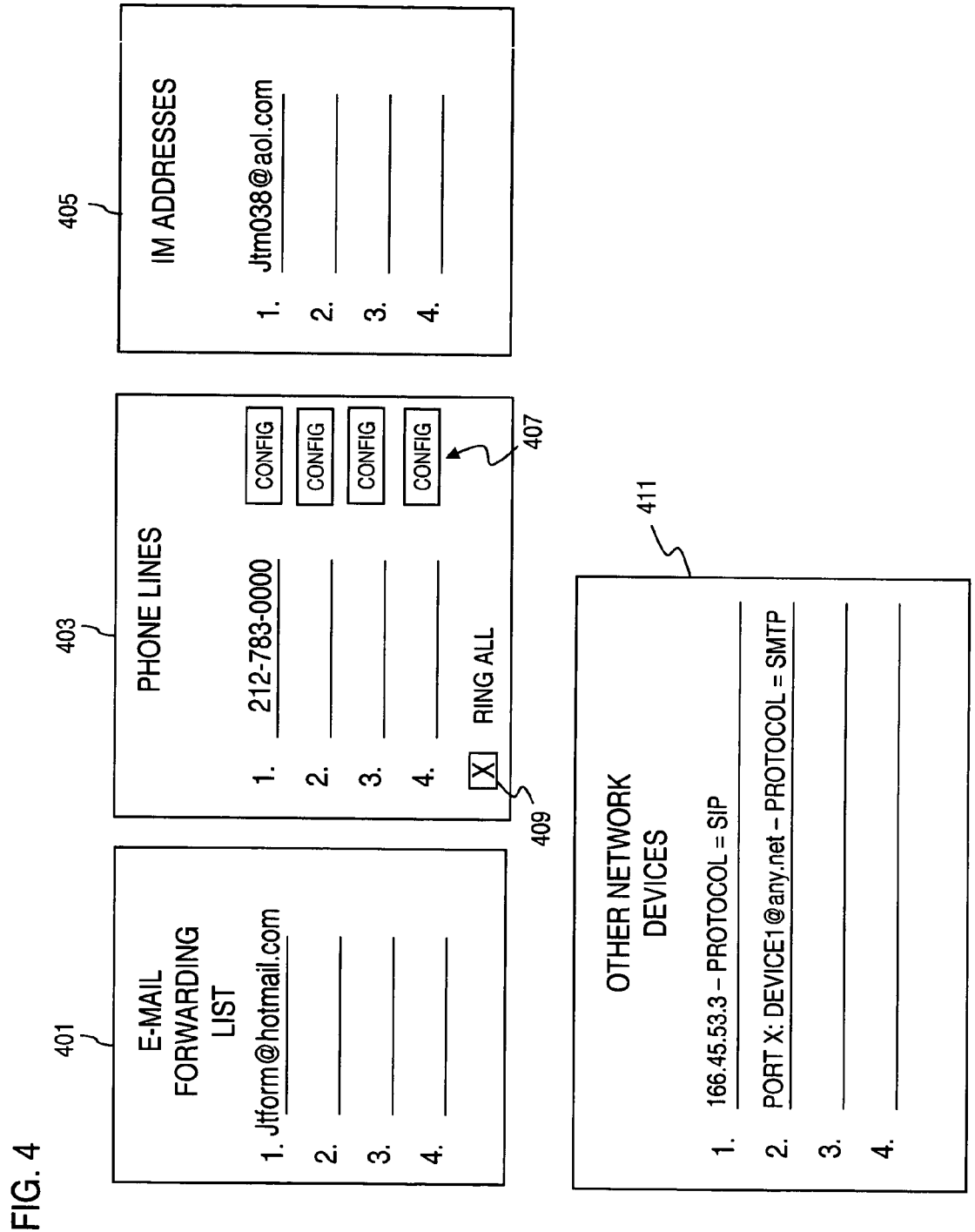
FIG. 4 is a diagram showing exemplary content of a user profile, in accordance with an embodiment of the present invention.

Also shown in FIG. 3 is a feature management server 321, which provides persistent feature-related information to be used in the course of handling calls. According to one embodiment of the present invention, the server 321 stores a profile associated with the subscriber. As previously indicated, this subscriber profile may contain, for example, a list of telephone numbers, contact addresses or other resources via which a subscriber may receive communications. Some typical profile information is depicted in FIG. 4.

Processing a given call involves interaction among recent presence information from the presence information server 323 and feature-controlling information from the feature management server 321. In addition, a directory function supported by a directory database 325 correlates the dialed number to a particular subscriber and support directory lookup functions that may be needed by the ISN platform 301. The ISN platform 301 can also provide assistance by way of a manual operator 327 for establishing communications, supplementing the automated response system, or helping with special needs or relay services.

The ISN platform 301 can supply a calling party with a variety of options during the process of attempting to reach a called party. Conventionally, such an inbound call would merely result in a call attempt to a single telephone number, with perhaps rollover to paging or voice-mail. Furthermore, the same destination telephone number would be used for every inbound call without any differentiation based on presence information or other features, except perhaps call forwarding. By contrast, within the system 300, once a calling party has made contact with ISN platform 301, the interaction proceeds with the calling party being presented options for communicating with the subscriber. The calling party is initially greeted with a prompt such as: "Welcome to OneMe. Please enter your PIN or choose one of the following options." Depending on the options for which the subscriber is configured (and perhaps taking into account presence information of the subscriber), the calling party is provided with, for example, various options. The calling party can select a "Find" option, which will cause the ISN platform 301 to attempt communications with the subscriber via one or more contacts, such as a set of contacts depicted in FIG. 4.

Alternatively, the calling party can select a second option, such as an "IM" option, to initiate contact with the subscriber via the IM client 305. Various techniques by which communications may even be established between the IM client 305 and a telephone connection are described in co-pending U.S. patent application, entitled "Telephony Services System with Instant Communications Enhancements" (Ser. No. 10/404,094), filed Apr. 2, 2003, and co-pending U.S. patent application, entitled "Messaging Response System" (Ser. No. 10/404,111), filed Apr. 2, 2003; both of which are incorporated by reference herein in their entireties.

A third option, e-mail option, can be provided, whereby the subscriber is notified by e-mail of the inbound call having occurred, along with the textual transcription of the calling party's speech or audio annotation, or imbedded media bearing a recording of the calling party (or links to where recordings are stored).

In the fourth option, the calling party may elect to have the call connected directly to a voice mail (VM) or video system 309, so that the message can be later delivered via transfer or streaming to a recipient device 305, 308, and 311. It is also contemplated that other communication options can be presented, such as paging, facsimile deposit, intermittent communications via push-to-talk devices, etc.

If the inbound call is actually from the subscriber seeking to access their own voice (or video) mail or other functions, then the calling party may supply a Personal Identification Number (PIN) number to become authenticated and to gain access to the subscriber functions.

It is recognized that special circumstances may arise when multiple contacts are attempted contemporaneously. It is possible that more than one telephone will be answered at nearly the same time. It is also conceivable that some contacts that correspond to the telephones may each have an associated auto-attendant or voice mail capability for automatically handling inbound calls. In accordance with an embodiment of the present invention, a calling party does not receive the ringback or call progress indicator signals that would normally arise from each contact (as if they were contacted individually). Instead, the calling party receives a ring back signal or interacts with the operator 327 in the ISN platform 301 as call attempts are made to the called party.

During such processing, the ISN platform 301 provides interactivity with any users who have answered the telephones. As each phone line is answered, the ISN platform 301 presents information about who the call is for and/or who is calling. The answering user on each answered line is prompted to accept or decline the inbound call. If none of the answering parties accepts the call, then the contacts are treated the same as a declined or unanswered call and the call may be forwarded to a particular voice mail, video, or e-mail system associated with the subscriber, if so configured.

The above approach avoids conflicts among multiple voice mail or telephone answering services. If an answering user accepts the call and all other calls go unanswered or are declined, then the call is connected to the party who accepted the call. If multiple lines are answered in response to the inbound call and the call is accepted by multiple answering parties, then the parties become coupled to the calling party in a conferencing or "party line" fashion, similar to the manner in which multiple parties on an analog telephone line may hear one another. This may be useful so that the parties may coordinate with one another about who should remain on the call.

FIG. 4 is a diagram showing exemplary content of a user profile, in accordance with an embodiment of the present invention. As early described, the user or subscriber profile can specify a set of contact locations. The profile may also contain configurable settings that related to calling feature functionality, privileges, service attributes, billing information, time-of-day dependent features, and other user-associated attributes that affect the handling of communications by the service providing system. Certain attributes in the profile may be directly reviewed and edited by the associated subscriber, whereas other attributes, such as subscriber privileges, may be controlled by a service provider or a designated administrator (as is typical in a business enterprise).

Upon initially establishing a profile, the service provider may provide for default communications settings. Default settings can be instituted by the service provider system automatically based on user behavior or other factors, such as time of day or day of week.

FIG. 4 shows four tables as examples of the type of information that may be contained in the profile associated with a subscriber; the subscriber profile may be changed to affect how services are implemented for the subscriber. Table 401 is an e-mail forwarding list. A phone contact table 403 provides a list of telephone numbers, and table 405 is a list of IM addresses. As the subscriber initially subscribes to such a service, the phone contact table 403 may have the subscriber's telephone number entered as the first entry. This default condition causes the system to initially act effectively as a "personal 800-number" service.

After the service is initialized, the subscriber may add telephone numbers to table 403 so that, for example, a "Find me" service may be implemented. As shown in table 403, each telephone number may be associated with a configuration button 407, so that attributes of each contact telephone number can be set by the subscriber. In an exemplary embodiment, these attributes include the type of device (such as telephone, pager, fax, voice-mail, etc.), number of rings to allow before abandoning the number, time of day features associated with the each number and other attributes. Furthermore, as shown by checkbox 409, the subscriber may indicate that inbound calls are to be handled by contacting all of the contacts provided in table 403.

Where inbound communications and the invocation of features involve reaching the subscriber by e-mail, table 401 is consulted to determine one or more addresses at which the subscriber may be reached. The subscriber may exercise control over the entries in this table.

Table 405 is consulted to determine one or more IM addresses at which the subscriber may be reached. The subscriber can edit the contents of this table 405 to cause IM messages or other communications that may be received at an IM client to be forwarded to the desired addresses. Table 411 provides a list of other network devices, and is accessed to determine whether any other device that is capable of receiving communications on behalf of the subscriber.

When a calling party seeks a subscriber, the contacts provided for the subscriber can be attempted sequentially, simultaneously, in an staggered or overlapping fashion and with some preferences observed (or any such combinations), depending upon the logic employed by the system and/or the preferences of the subscriber as expressed, for example, in tables 401, 403 and 405 in FIG. 4. The contacts may be presence-related. That is, the complement of contacts provided may be dependent upon presence information for the subscriber.

A subscriber may access their profile information and other functions of the system in a variety of ways. For instance, through a telephone connection or other form of audio interface, subscribers may access a voice response unit or voice portal, allowing them to review and make modifications to their profile information, account information and other pertinent aspects of the features provided by the network. The subscriber may also check messages or other stored communications tendered by the network, as well as check the log of activities to observe communications activities that have occurred. The subscriber can change their presence status or may temporarily override aspects of how inbound calls are handled. Any of these facilities that can be accessed or controlled by the subscriber can be accessed through Web applications, text messaging, e-mail, or any other form of communication by which the subscriber would normally communicate with other parties.

Figure 5A:
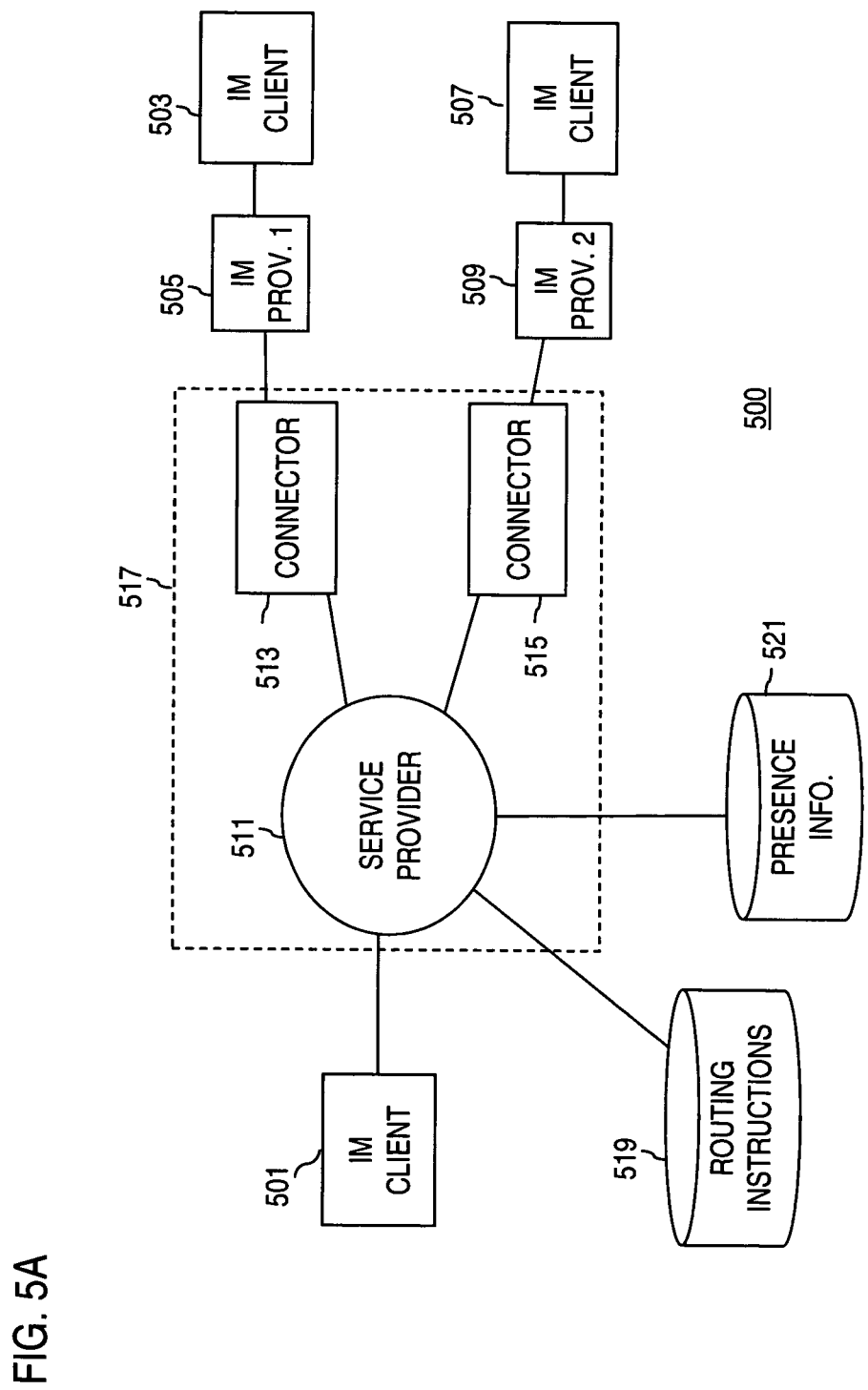
FIGS. 5A and 5B are, respectively, a diagram of an instant communication environment supporting universal relay services, and a flowchart of the process of providing universal relay service, according to an embodiment of the present invention.
Figure 5B:
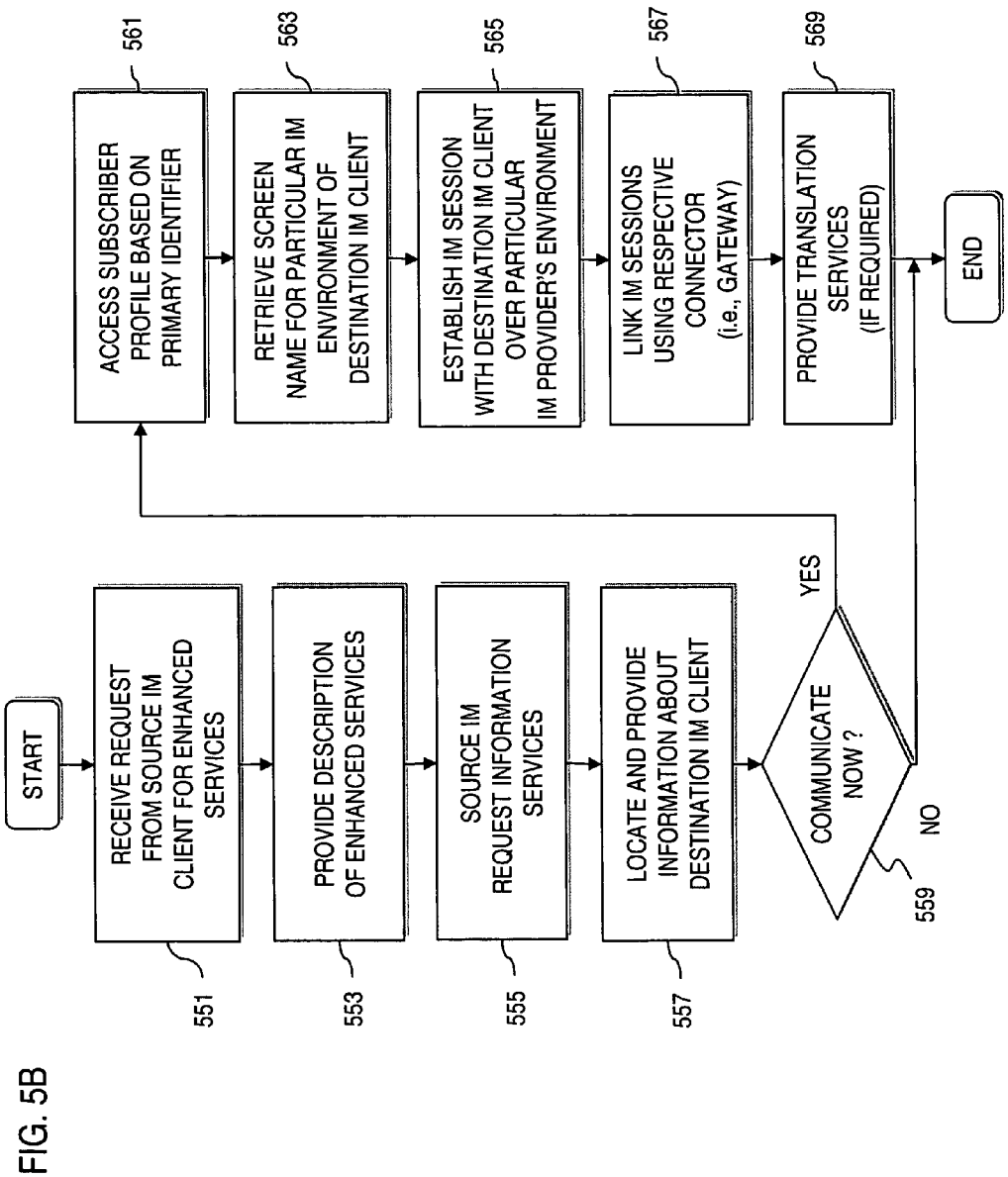

FIGS. 5A and 5B are, respectively, a diagram of an instant communication environment supporting universal relay services, and a flowchart of the process of providing universal relay service, according to an embodiment of the present invention. As noted, depending on the service configuration, a subscriber may be notified of an incoming call (or, more generally, a communications attempt) from another party via IM client. Through instant messaging from the ISN platform 301, the subscriber may be informed of the calling party's identity or other associated information as derived from a variety of possible sources, such as corporate or network directories.

Furthermore, the subscriber may be able to alter the handling of the call via instant messaging. For example, the subscriber may use instant messaging to instruct the ISN platform 301 to forward the call to voice mail or to another destination. Alternatively, the subscriber may elect to "take"

the call using the instant messaging client as an audio interface or a textual interface with text-speech translation being provided by the service provider. This scenario exemplifies several important advantages to a comprehensive service offering using in-network feature processing rather than relying upon processing at an end user device. The subscriber may also use instant messaging to perform a rollover from one mode of communication to another.

Accordingly, the notion of a "universal" message relay is effected. The universal message relay allows a subscriber to receive communications via a screen name that is derived from the primary identifier, even if the subscriber is actually using a different, perhaps pre-existing screen name account on one of a multitude of IM services. As described earlier, this allows a comprehensive communication provider to allocate a screen name, consistent with the subscriber's suite of identifiers, without worrying about conflicts with other screen names or addresses.

The arrangement of FIG. 5A illustrates an approach to accomplish a remapping of addresses and rerouting of traffic such that the screen name adopted for the overlay services is independent of whatever particular IM services and screen names the subscriber employs. The mapping of the users' assigned screen name to one or more IM screen names is determined by a list in the subscriber's profile information, as shown in FIG. 4.

In the example of FIG. 5A, within communication system 500, an IM client 501 (i.e., a source client) seeks to communicate with a subscriber (e.g., a destination IM client 503) by addressing messaging communications to a screen name derived from the primary identifier associated with the subscriber. The IM client 503 represents an IM client through which the subscriber communicates through an IM service provider 505. An IM client 507 represents another client through which the subscriber can communicate using a different IM service provider 509. As mentioned before, different IM service providers 505, 509 may use proprietary software, techniques and protocols which are generally not compatible among providers. Nevertheless, in accordance with the present teachings, a single communication addressed to the subscriber using a screen name based on the primary identifier described herein may be routed to either or both of the different types of clients 503 and 507.

Furthermore, the addresses by which IM client 501 may direct communications to these other clients are entirely independent of the screen names by which each of the clients is known in their respective IM services.

A user using IM client 501 may contact a service provider system 511 and interact with, and engage the services of, an automatic or manual operator (e.g., operator 327 of FIG. 3) to assist in establishing communications. The service provider system 511 may provide the same array of enhanced services and interactivity as the ISN platform 301.

By way of example (per FIG. 5B), the IM client 501, as a source IM client, initiates a request for enhanced services, per step 551. In turn, the system 511 provides a description of the enhanced services (step 553). Under this scenario, the IM client 501 requests information services (as part of the enhanced service offerings), as in step 555; consequently, the system 511 locates and provides the information about the destination IM client to the source IM client 501 (step 557). Thereafter, the service provider system 511 prompts the IM client 501 to determine whether the IM client 501 would like to communicate with the destination IM client, as in step 559. If the IM client 501 does not seek to immediately communicate, but was only interested in obtaining information about the destination IM client, the process ends.

However, if the IM client 501 wishes to communicate with the destination IM client, the service provider system 511 accesses profile information pertaining to the subscriber (step 561). Part of this profile information, similar to the table 405, may provide the service provider system 511 with a mapping of the screen name used by IM client 501 to the screen names, corresponding to IM clients 501 or 507. The profile information may also direct the service provider system to invoke features relating to establishing contact between IM client 501 and the other IM clients shown, or perhaps other devices associated with the subscriber. At this point, the service provider system 511 may be used to provide information service to the source communicator, for example, a service similar to traditional directory look-up, whereby the communicator retrieves the information.

It is noted that because various IM services may employ different techniques and servers and networks that the service provider system 511, in order to forward messaging communications to the IM clients 503, 507, may need to be adapted to the protocols and interfaces for proper operation with the respective systems 505, 509. Consequently, connectors (or gateways) 513 and 515 are used to interface the service provider system 511 to the particular requirements of corresponding IM messaging environments (which generally are proprietary). It should be noted that, because communications from another party may originate from an IM client 501 that is compliant with disparate IM services, some additional measures may be needed to ensure that service provider system 511 is receptive to communications from any possible originating IM client. Thus, it is noteworthy to point out that as communications enter from an IM client of one type and are coupled to an IM client belonging to the subscriber, which may be of a different type, the service provider system 511 also accomplishes a translation of sorts between different IM services.

In step 563, the service provider system 511 retrieves a screen name for a particular IM environment of a destination IM client (e.g., client 503 or 507). For instance, if the destination IM client is the IM client 503, the screen name would correspond with an identifier that is recognizable by the IM provider 505. Based on the retrieved screen name, an IM session is established with the IM client 503 within the IM environment operated by the specified provider, as in step 565. Next, the connector 513 in conjunction with the service provider system 511 links the IM sessions, per step 567. As mentioned, the service provider system 511 may need to participate in the communication to translate information or protocols to facilitate the communication, per step 569.

Thus, the combination of the service provider system 511 and one or more connectors 513, 515 which interface the service provider to IM services constitutes a Universal Message Relay network 517 which accomplishes the task of decoupling the screen name used by IM client 501, which was derived from the primary identifier for the target subscriber, from the particular screen names that the subscriber uses in the various IM services. This, in turn, allows a service provider to arbitrarily assign a screen name to the subscriber that is derived from the primary identifier and is correlated to analogous identifiers used in other modes of communication over which the service provider, has control of the name space.

In an exemplary embodiment, the profile information associated with subscribers, as well as other information that may affect how communications are established with the subscriber, can be stored in routing instruction database 519 and made accessible to the service provider system 511. In the course of processing other features that may be invoked in response to the request from IM client 501, the service provider system 511 may also access presence information pertaining to the subscriber as stored or maintained in a presence information database 521.

Figure 6:
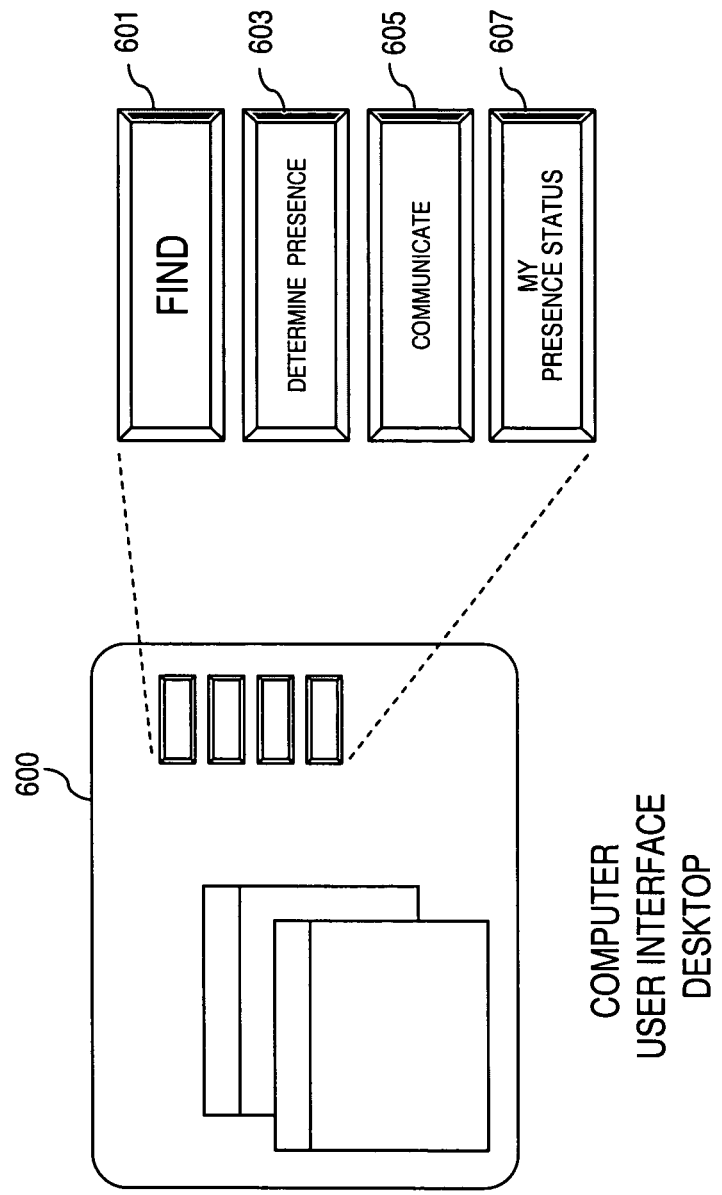
FIG. 6 is a diagram of an exemplary graphical user interface (GUI) for supporting Find and Presence functions, according to an embodiment of the present invention.

FIG. 6 is a diagram of an exemplary graphical user interface (GUI) for supporting Find and Presence functions, according to an embodiment of the present invention. As shown, a computer user interface desktop 600 has several activatable controls related to communications over the services overlay network 101. These controls may reside on the desktop of the interface provided to the user or may be provided as toolbar icons presented in conjunction with applications being run on the computer.

In this example, a button 601, labeled "Find," can be activated by a user to access one or more directory services of the overlay network 101; such directory services are more fully described below with respect to in FIG. 7. Activating this button 601 may provide the user with addresses or contact information by which another party may be reached. Accessing this information may be preparatory to communications or may be done simply to retrieve address information for reference purposes.

Additionally, a button 603, labeled "Determine Presence," allows the user to determine the current availability of a party. This information is useful prior to attempting to establish communications with the party, which if known, can avoid waste of network resources and time and effort of the subscriber. Having activated the button 601, the user may have selected a particular party of interest and this information may serve as a context for invoking button 603 to determine presence of that party.

A button 605, labeled "Communicate," allows the user to take the next step of establishing communications with the identified party. Further, a button 607, labeled "My Presence Status," allows the user to interact with the network for altering their own presence indication within the network. This is the presence indication that indicates availability of the user as it would be represented to other parties.

It should be noted that buttons 603, 605, 607 and preferably button 601 access capabilities and functions within the network directly from the user's desktop.

Figure 7:
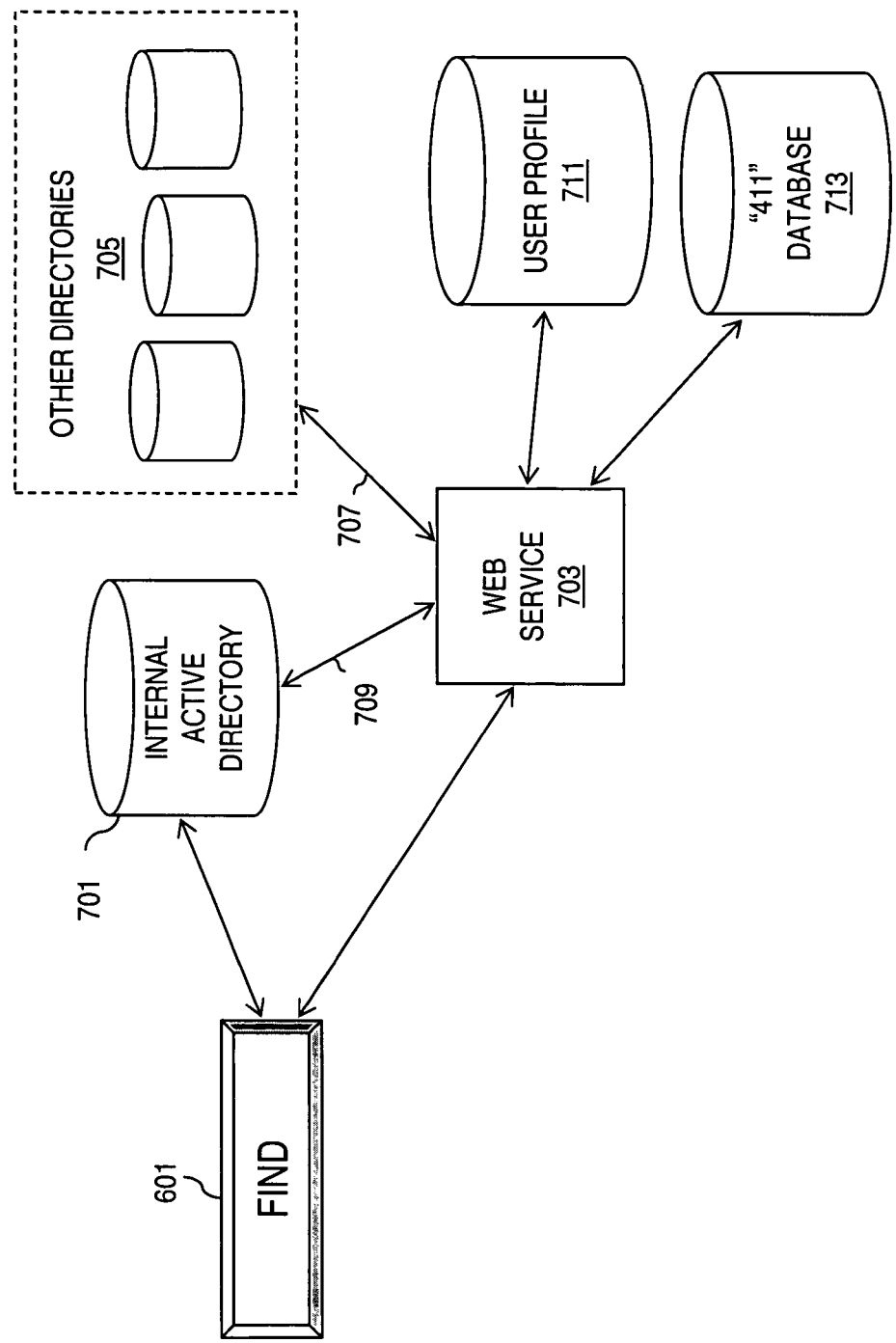
FIG. 7 is a diagram of the directories utilized in implementing the Find service initiated by the GUI of FIG. 6, according to an embodiment of the present invention.

FIG. 7 is a diagram of the directories utilized in implementing the Find service initiated by the GUI of FIG. 6, according to an embodiment of the present invention. Akin to accessing an enterprise address book for sending e-mails, a "Find" button 601 may access an active directory 701 that is internal, for instance, to a business or enterprise. Through communication with Web application or Web service 703, the button 601 may avail the user of directories outside of the user's company or local domain. For example, the user accesses directories 705 of other companies when the appropriate authorization mechanisms are in place. A connection 707 supports communication between the directories 705 and the Web service 703. Through connection 709, at least part of the directory 701 being made available to other parties to Web service 703. It is recognized that mutually shared access of directory information across companies may be useful and appropriate for collaboration among companies, promoting contact of sales and support personnel and other types of business relationships.

As seen in FIG. 7, the Web service 703 also interfaces with a user database 711 that can store user (or subscriber) profile information, as detailed with respect to FIG. 4. Additionally, a directory assistance (i.e., "411") database 713 can be maintained by a service provider for a large number of subscribers to the service.

It is contemplated that a comprehensive directory service as depicted in FIG. 7 may service requests through a variety of vehicles. For example, request for a directory look-up may be submitted from a user or an application via e-mail and the directory may act upon the request and provide a response by e-mail or other means, perhaps as specified by the requestor.

As evident from the above discussion, a communications service provider may advantageously provide a comprehensive service that spans many modes of communications and provide allocation of coordinated identifiers to improve the convenience of using the various modes. An approach is set forth for using a primary identifier to derive a set of addresses or identifiers suitable for the various modes of communication supported. This addressing scheme permits integration of the several modes of communication into a cohesive overall communication service with many significant practical and functional advantages. This approach facilitates communications among parties by any available means and enables a rich feature set encompassing many modes of communication. Hence, a single "call origination" may explore many more possibilities and may entail greater interactivity and flexibility than previously possible.

The overlay network 101 of FIG. 1 centralizes, and provides ubiquitous access to, such elemental functions as presence indication and user profile management which may now be commonly employed across any of the available modes of communication. The offering of a comprehensive service also allows for comprehensive tracking, accounting and billing for usage activity across many modes of communication.

Figure 8:
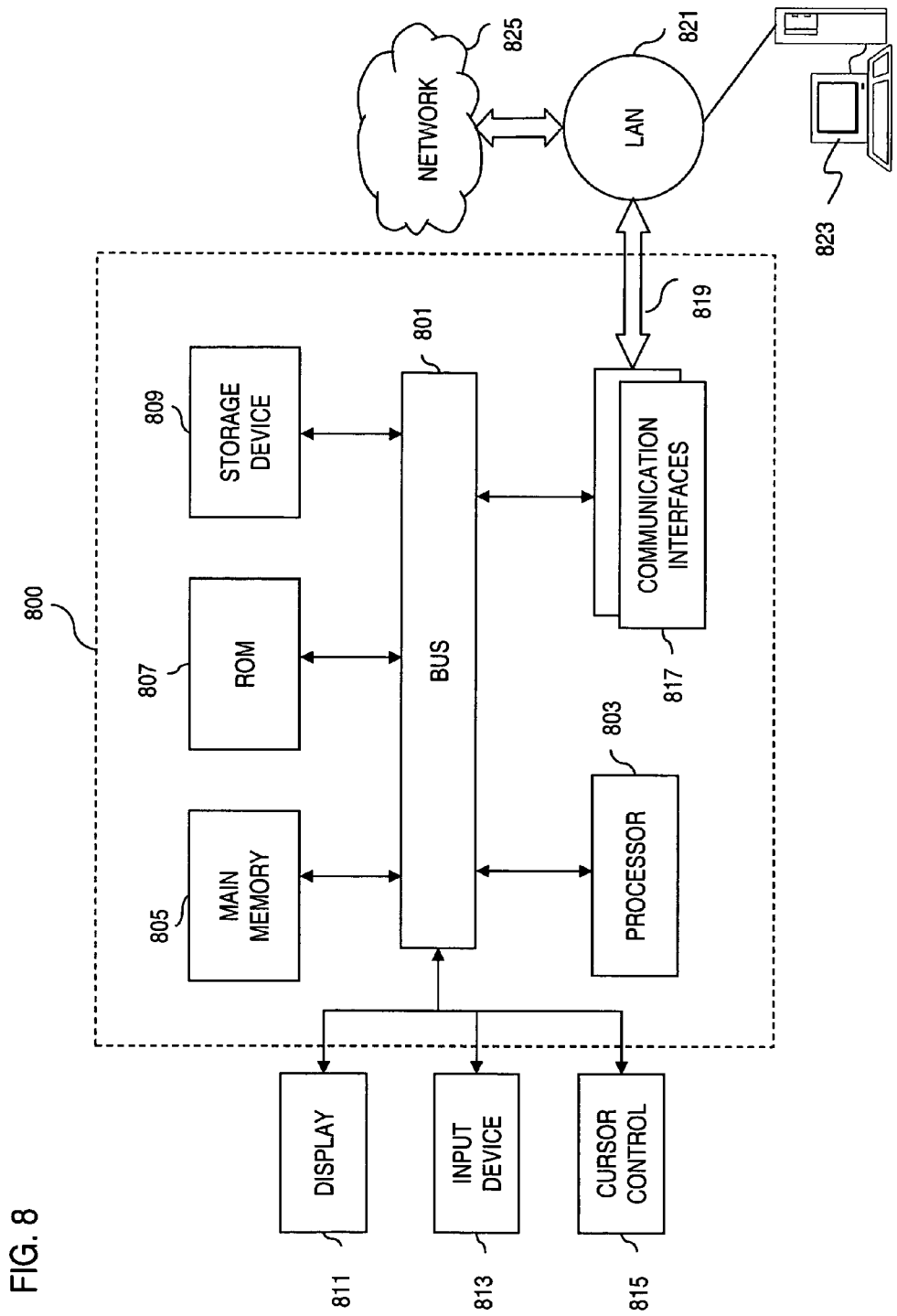
FIG. 8 is a diagram of a computer system that can be used to implement an embodiment of the present invention.

It is recognized that the functions of the overlay network 101 can be implemented by any variety of computing systems, such as the one shown in FIG. 8.

FIG. 8 illustrates a computer system 800 upon which an embodiment according to the present invention can be implemented. The computer system 800 includes a bus 801 or other communication mechanism for communicating information and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to one embodiment of the invention, the processes for supporting universal identifiers can be provided by the computer system 800 in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the present invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the present invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g., for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g., a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the present invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 805 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

The following patent applications are incorporated by reference in their entireties: co-pending U.S. patent application Ser. No 10/975,595 filed on even date herewith, entitled "Comprehensive Communication Services System"; co-pending U.S. patent application Ser. No. 10/975,215 filed on even date herewith, entitled "Universal Communications Identifier"; and co-pending U.S. patent application Ser. No. 10/975,214 filed on even date herewith, entitled "Method and System for Extended Directory Service."

While the present invention has been described in connection with a number of embodiments and implementations, the present invention is not so limited but covers various obvious modifications and equivalent arrangements, which fall within the purview of the appended claims.

What is claimed is:

1. A method for providing instant messaging (IM) services, the method comprising:
receiving a request from a source client to establish communication with a destination client associated with a subscriber over a first IM environment, wherein the request specifies a first user name automatically derived from a unique identifier of the subscriber;
determining the unique identifier from the first user name; and accessing a profile of the subscriber using the unique identifier to arbitrarily assign a second user name identifying the subscriber corresponding to a second IM environment, wherein an IM session is established between the source client and the destination client over the first and second IM environments using the respective first user name and second user name.

2. A method according to claim 1, wherein the first IM environment corresponds to a first service provider, and the second IM environment corresponds to a second service provider.

3. A method according to claim 2, wherein the second user name is based on the unique identifier.

4. A method according to claim 1, further comprising:
determining presence of the subscriber within the second IM environment.

5. A method according to claim 1, wherein the second user name is transparent to the source IM client.

6. A method according to claim 1, further comprising:
providing linguistic translation service for the IM session.

7. A method according to claim 1, further comprising:
receiving an information request from the source client about the destination client; and
forwarding a response including the requested information about the destination client to the source client.

8. A non-transitory computer-readable storage medium carrying one or more sequences of one or more instructions for providing instant messaging (IM) services, the one or more sequences of one or more instructions including instructions which, when executed by one or more processors, cause the one or more processors to perform the steps of:
receiving a request from a source client to establish communication with a destination client associated with a subscriber over a first IM environment, wherein the request specifies a first user name automatically derived from a unique identifier of the subscriber;
determining the unique identifier from the first user name; and
accessing a profile of the subscriber using the unique identifier to arbitrarily assign a second user name identifying the subscriber corresponding to a second IM environment,
wherein an IM session is established between the source client and the destination client over the first and second IM environments using the respective first user name and second user name.

9. A computer-readable storage medium according to claim 8, wherein the first IM environment corresponds to a first service provider, and the second IM environment corresponds to a second service provider.

10. A computer-readable storage medium according to claim 9, wherein the second user name is based on the unique identifier.

11. A computer-readable storage medium according to claim 8, further comprising instructions for causing the one or more processors to perform the step of:
determining presence of the subscriber within the second IM environment.

12. A computer-readable storage medium according to claim 8, wherein the second user name is transparent to the source IM client.

13. A computer-readable storage medium according to claim 8, further comprising instructions for causing the one or more processors to perform the step of:
providing linguistic translation service for the IM session.

14. A computer-readable storage medium according to claim 8, further comprising instructions for causing the one or more processors to perform the steps of:
receiving an information request from the source client about the destination client; and
forwarding a response including the requested information about the destination client to the source client.

15. A method for communicating with an instant messaging (IM) client, the method comprising:
generating a request for establishing communication with a destination client associated with a subscriber of an overlay communication system over a first IM environment;
sending the request to the overlay communication system, wherein the request specifies a first user name automatically derived from an identifier uniquely identifying the subscriber within the overlay communication system, the overlay communication system accessing a profile of the subscriber using the identifier to arbitrarily assign a second user name identifying the subscriber corresponding to a second IM environment, wherein the second user name is independent of the first and second IM environments and wherein an IM session is established with the destination client over the first and second IM environments using the respective first user name and second user name; and
communicating with the destination client through the overlay communication system.

16. A method according to claim 15, wherein the first IM environment corresponds to a first service provider, and the second IM environment corresponds to a second service provider.

17. A method according to claim 16, wherein the second user name is based on the unique identifier.

18. A method according to claim 15, wherein the overlay communication system determines presence of the subscriber within the second IM environment.

19. A method according to claim 15, wherein the second user name is transparent to the source IM client.

20. A method according to claim 15, further comprising:
requesting linguistic translation service from the overlay communication system for the IM session.

21. A method according to claim 15, further comprising:
forwarding an information request about the destination client to the overlay communication system; and
receiving a response from the overlay communication system, the response including the requested information about the destination client.

22. A system for supporting instant messaging (IM) communication, the system comprising:
an overlay network configured to provide a plurality of communication services including telephony and data communication services, and to receive a request from a source client to establish communication with a destination client associated with a subscriber over a first IM environment, wherein the request specifies a first user name automatically derived from a unique identifier of the subscriber, the overlay network being further configured to determine the unique identifier from the first user name, and to access a profile of the subscriber using the unique identifier to arbitrarily assign a second user name identifying the subscriber corresponding to a second IM environment; and
a gateway communicating with the overlay network to establish an IM session between the source client and the destination client over the first and second IM environments using the respective first user name and second user name.

23. A system according to claim 22, wherein the first IM environment corresponds to a first service provider, and the second IM environment corresponds to a second service provider.

24. A system according to claim 23, wherein the second user name is based on the unique identifier.

25. A system according to claim 22, wherein the overlay network is further configured to determine presence of the subscriber within the second IM environment.

26. A system according to claim 22, wherein the second user name is transparent to the source IM client.

27. A system according to claim 22, wherein the overlay network provides linguistic translation service for the IM session.

28. A system according to claim 22, wherein the source client requests information about the destination client, and the overlay network forwards a response including the requested information about the destination client to the source client.

* * * * *